United States Patent
Lu

(10) Patent No.: US 11,802,800 B2
(45) Date of Patent: *Oct. 31, 2023

(54) CAPACITOR-BASED TEMPERATURE-SENSING DEVICE

(71) Applicant: Taiwan Semiconductor Manufacturing Co., Ltd., Hsin-Chu (TW)

(72) Inventor: Shih-Lien Linus Lu, Hsinchu (TW)

(73) Assignee: Taiwan Semiconductor Manufacturing Co., Ltd., Hsin-Chu (TW)

( * ) Notice: Subject to any disclaimer, the term of this patent is extended or adjusted under 35 U.S.C. 154(b) by 263 days.

This patent is subject to a terminal disclaimer.

(21) Appl. No.: 17/317,741

(22) Filed: May 11, 2021

(65) Prior Publication Data

US 2021/0262865 A1 Aug. 26, 2021

Related U.S. Application Data

(63) Continuation of application No. 16/041,141, filed on Jul. 20, 2018, now Pat. No. 11,009,404.

(60) Provisional application No. 62/564,715, filed on Sep. 28, 2017.

(51) Int. Cl.
| | |
|---|---|
| *G01K 7/00* | (2006.01) |
| *G01K 7/34* | (2006.01) |
| *H01G 4/10* | (2006.01) |
| *G05D 23/20* | (2006.01) |
| *G01K 3/00* | (2006.01) |
| *G01K 1/02* | (2021.01) |

(52) U.S. Cl.
CPC ............... *G01K 7/34* (2013.01); *G01K 1/026* (2013.01); *G01K 3/005* (2013.01); *G05D 23/2033* (2013.01); *H01G 4/10* (2013.01)

(58) Field of Classification Search
CPC .......... G01K 7/34; G01K 1/026; G01K 3/005; G05D 23/2033; H01G 4/10; H01G 4/38
See application file for complete search history.

(56) References Cited

U.S. PATENT DOCUMENTS

| | | | | |
|---|---|---|---|---|
| 2008/0203389 A1* | 8/2008 | Ozoe | ...................... | G01K 7/015 257/E29.328 |
| 2013/0265019 A1* | 10/2013 | Huang | .................... | G05F 3/245 323/272 |
| 2014/0118034 A1* | 5/2014 | Lemkin | ..................... | H03L 5/02 327/143 |
| 2014/0321507 A1* | 10/2014 | Aliane | ................... | G01K 7/343 374/184 |
| 2019/0120700 A1 | 4/2019 | Lu et al. | | |

* cited by examiner

*Primary Examiner* — Lisa M Caputo
*Assistant Examiner* — Nasir U. Ahmed
(74) *Attorney, Agent, or Firm* — Duane Morris LLP

(57) ABSTRACT

A temperature-sensing device configured to monitor a temperature is disclosed. The temperature-sensing device includes: a first capacitor comprising a first oxide layer with a first thickness; a second capacitor comprising a second oxide layer with a second thickness, wherein the second thickness of the second oxide layer is different from the first thickness of the first oxide layer; and a control logic circuit, coupled to the first and second capacitors, and configured to determine whether the monitored temperature is equal to or greater than a threshold temperature based on whether at least one of the first and second oxide layers breaks down.

20 Claims, 4 Drawing Sheets

CAPACITOR-BASED TEMPERATURE-SENSING DEVICE

CROSS-REFERENCE TO RELATION APPLICATIONS

The present application is a continuation of U.S. patent application Ser. No. 16/041,141, filed on Jul. 20, 2018, which claims priority to U.S. Provisional Patent Application No. 62/564,715, filed on Sep. 28, 2017, each of which is incorporated by reference herein in its entirety.

BACKGROUND

Aggressive technology scaling for high performance integrated circuits has resulted in higher current densities in interconnection lines and devices, which in turn increases power dissipation. Generally, a significant amount of such dissipated power converts to heat, which thus causes a substantial rise in heat density. Respective different operation modes of each of the functional blocks in a high performance integrated circuit cause temperature gradients on a respective substrate where the integrated circuit is formed. The above-mentioned scenarios lead to a need for a lightweight, robust, and power-efficient on-chip temperature-sensing device that can be used for accurate thermal mapping and thermal management.

BRIEF DESCRIPTION OF THE DRAWINGS

Aspects of the present disclosure are best understood from the following detailed description when read with the accompanying figures. It is noted that various features are not necessarily drawn to scale. In fact, the dimensions and geometries of the various features may be arbitrarily increased or reduced for clarity of discussion.

DETAILED DESCRIPTION OF EXEMPLARY EMBODIMENTS

Figure 1:
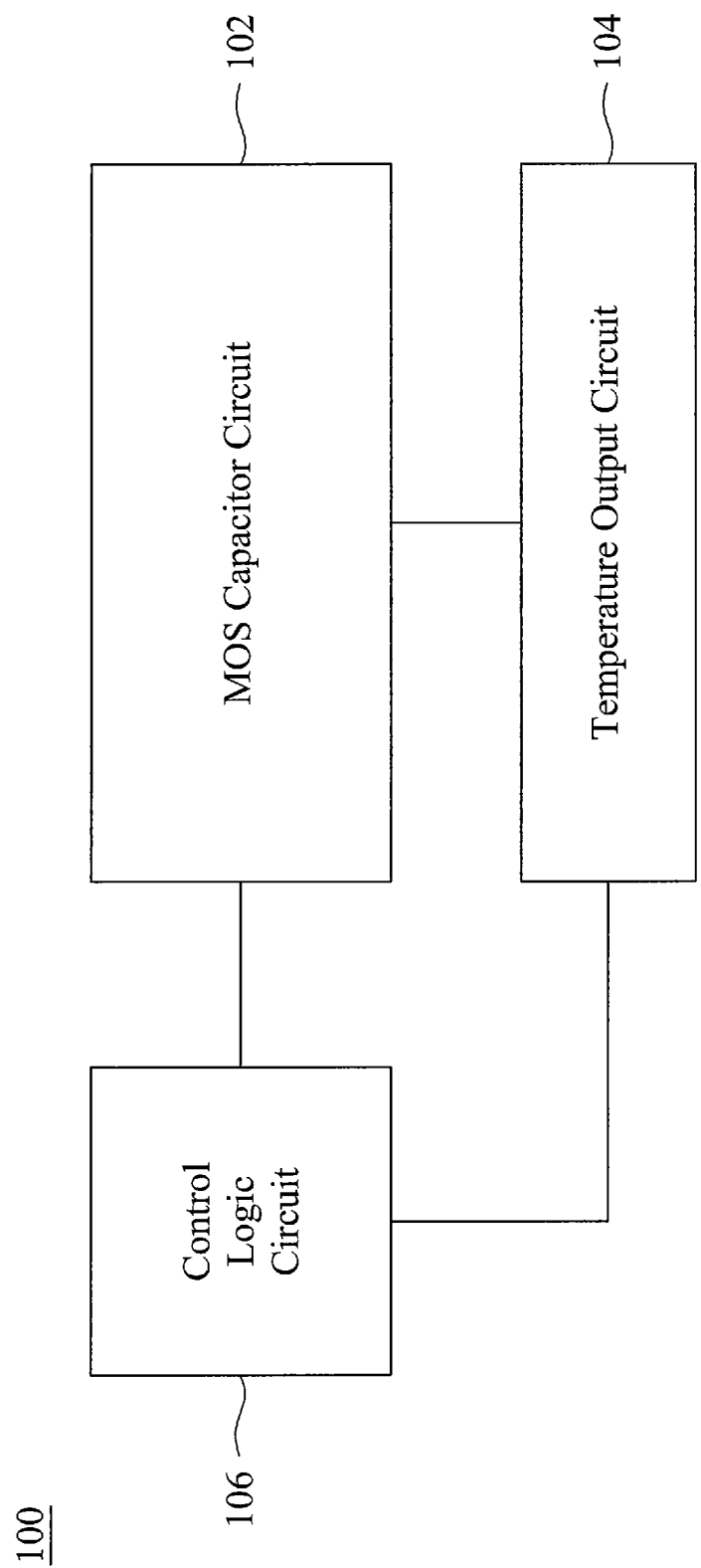
FIG. 1 illustrates a block diagram of a temperature-sensing device, in accordance with some embodiments.

The following disclosure describes various exemplary embodiments for implementing different features of the subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

To accurately monitor temperature of an integrated circuit, a variety of on-chip temperature-sensing devices have been proposed over the years such as, for example, an on-chip thermal sensor. In general, an on-chip thermal sensor is an integral part of an integrated circuit that provides one or more additional layers of protection. The on-chip thermal sensor can be used to detect whether the integrated circuit is being hacked, for example, by sensing a presence of an abnormal temperature. As such, the integrated circuit's security protection can be improved. The on-chip thermal sensor can also be used to provide feedback to other on-chip circuits/components so as to allow those on-chip circuits/components to adjust respective circuit parameter(s) to prevent generating excessive heat. Accordingly, the whole integrated circuit (system) can operate more efficiently and reliably.

Conventional on-chip thermal sensors typically utilize a variety of temperature-varying physical parameters (e.g., voltage) to detect/measure temperature. Such conventional thermal sensors are subjected to a variety of issues when integrated into an integrated circuit. In an example, one or more diodes (p-n junction devices) are used to measure temperature by comparing respective voltage drops based on a temperature-varying characteristic of the voltage drop. However, integrating the diodes into an integrated circuit typically encounters a variety of issues, e.g., re-allocation of real estate to accommodate the diode(s) and one or more reference circuits, high power consumption of the diode(s), etc. In another example, a metal-oxide-semiconductor (MOS) transistor is used as an on-chip thermal sensor by using the MOS transistor's temperature-varying threshold voltage. Although such MOS-based thermal sensors are relatively smaller in size and have lower power consumption, integrating the MOS-based thermal sensors into an integrated circuit still encounters a variety of issues such as, for example, difficulty in scaling with other on-chip components/circuits of the integrated circuit, requiring at least one reference circuit, etc. Thus, conventional on-chip thermal sensors are not entirely satisfactory.

The present disclosure provides various embodiments of a temperature-sensing device, including a plurality of metal-oxide-semiconductor (MOS) capacitors, that is configured to monitor a temperature. In some embodiments, the disclosed temperature-sensing device may be integrated into a system circuit (e.g., a system-on-chip (SoC) circuit, a system-in-package (SiP), etc.) so as to monitor an on-chip temperature of the system circuit.

According to some embodiments, each of the plurality of MOS capacitors of the temperature-sensing device includes a respective oxide layer disposed (e.g., sandwiched) between a metal layer and a semiconductor layer. More specifically, in some embodiments, the oxide layers of the plurality of MOS capacitors have respective different thicknesses, which allows the plurality of MOS capacitors to present respective different oxide breakdown behaviors under respective different temperatures. In some embodiments, the temperature-sensing device includes a temperature output circuit, coupled to the plurality of MOS capacitors, that includes a plurality of comparison circuits. Each comparison circuit is coupled to a respective MOS capacitor and configured to sense a change of a current signal flowing through the respective MOS capacitor when each respective oxide layer breaks down under a respective temperature. As such, in accordance with some embodiments of the present disclosure, the temperature-sensing device may be used to determine whether a monitored temperature has exceeded one of a plurality of pre-defined temperatures, which will be discussed in further detail below.

FIG. 1 illustrates a block diagram of a temperature-sensing device 100, in accordance with various embodiments. As mentioned above, the temperature-sensing device 100 is integrated into a system circuit (not shown), and configured to monitor an on-chip temperature of the system circuit. In some embodiments, the temperature-sensing device 100 includes a MOS capacitor circuit 102, a temperature output circuit 104, and a control logic circuit 106.

In some embodiments, the MOS capacitor circuit 102 includes a plurality of MOS capacitors. In some embodiments, each of the plurality of MOS capacitors includes a respective conductive contact (e.g., a metal contact, a polysilicon contact, or the like), an oxide layer, and a semiconductor substrate, wherein the oxide layer is sandwiched between the metal contact and semiconductor substrate, as discussed in further detail below. Although only the MOS capacitors are described in the following discussion, it is noted that, in some other embodiments, the MOS capacitor circuit 102 can include any of various types of capacitors such as, for example, metal-insulator-metal (MIM) capacitors, metal-insulator-semiconductor (MIS) capacitors, while remaining within the scope of the present disclosure.

In some embodiments, the respective semiconductor substrates may each includes a silicon substrate, or alternatively, include other elementary semiconductor material (e.g., germanium) and/or a compound semiconductor material (e.g., silicon carbide, gallium arsenic, indium arsenide, and indium phosphide). In some embodiments, the semiconductor substrate of each MOS capacitor may include an alloy semiconductor material, for example, silicon germanium, silicon germanium carbide, gallium arsenic phosphide, and gallium indium phosphide.

Figure 4:
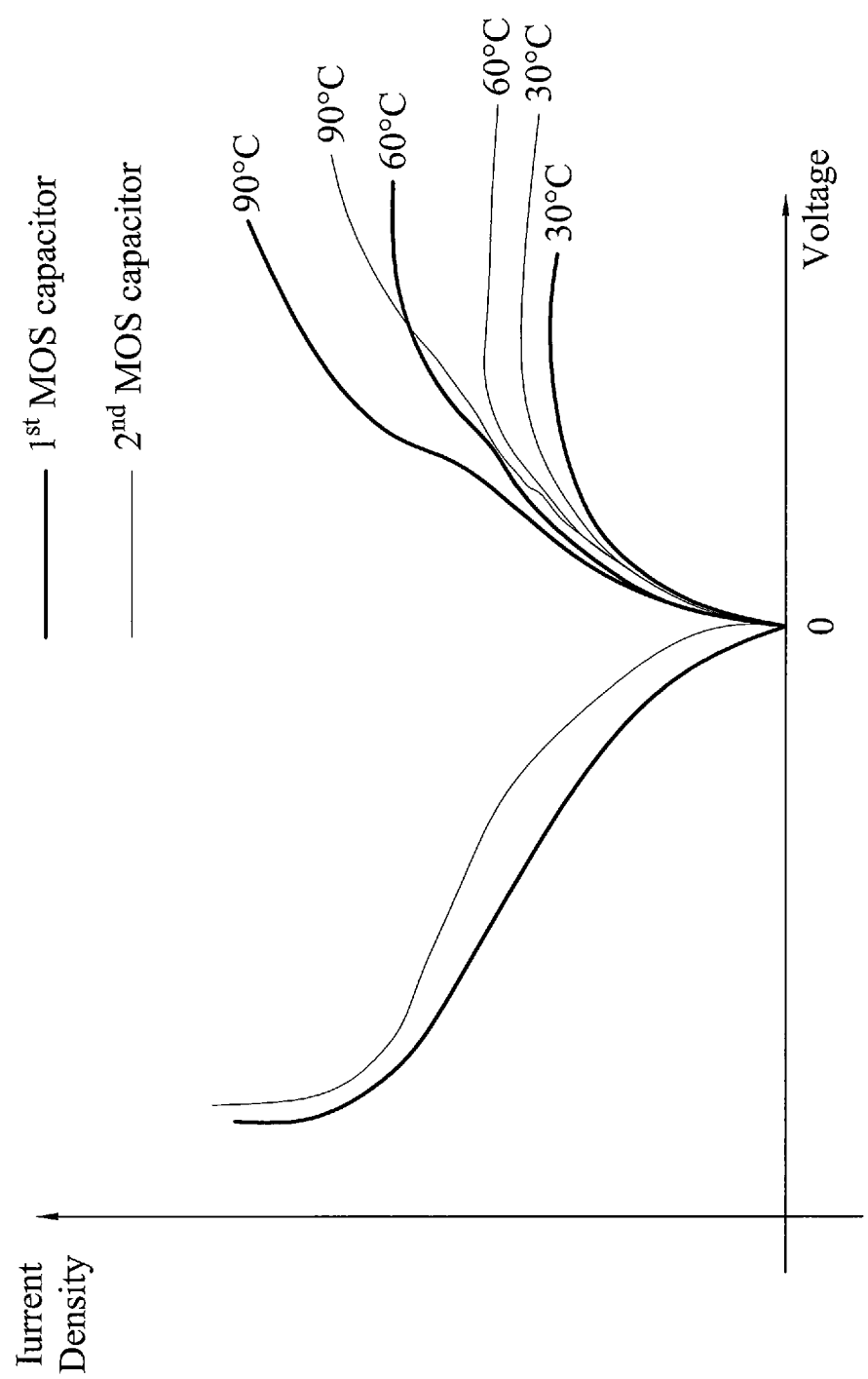
FIG. 4 illustrates soft breakdown behaviors of first and second MOS capacitors of the temperature-sensing device of FIG. 1 over various different temperatures, respectively, in accordance with some embodiments.

According to some embodiments of the present disclosure, the oxide layers of the plurality of MOS capacitors (of the MOS capacitor circuit 102) have respective different thicknesses. Such different thicknesses cause the oxide layers to present respective different breakdown behaviors under a varying temperature so as to allow the corresponding MOS capacitors to be conducted differently. In a non-limiting example, when a first oxide layer has a thicker thickness (e.g., about 3.1 nanometers (nm)) and a second oxide layer has a thinner thickness (e.g., about 2.9 nm) and when corresponding first and second MOS capacitors (of the MOS capacitor circuit 102) respectively including the first and second oxide layers are biased under a same voltage, the first oxide layer presents a "soft breakdown (SBD)" behavior at a first temperature substantially lower than a second temperature when the second oxide layer does. As understood by persons of ordinary skill in the art, a MOS capacitor typically presents a SBD behavior when the MOS capacitor is positively biased (i.e., a positive voltage is applied on the metal end with respect to the semiconductor end), which effectively presents a voltage-dependent conductive behavior. FIG. 4 illustrates such SBD behaviors of the first and second MOS capacitors observed over three different temperatures, respectively. As shown, when the first MOS capacitor is positively biased (i.e., when the voltage along the X-axis is larger than 0 V) and at temperature of about 30° C., the first MOS capacitor presents a saturated current density. As the voltage positively increases at temperature of about 60 and 90° C., respectively, the respective current densities conducting through the first MOS capacitor change along with the voltage, which shows that the first MOS capacitor presents the SBD behavior at both 60 and 90° C. In contrast, the second MOS capacitor does not present the SBD behavior until the temperature is elevated to about 90° C. In some embodiments, the first and second temperatures under which the first and second oxide layers respectively present SBD behaviors are herein referred to as "first breakdown temperature" of the first oxide layer and "second breakdown temperature" of the second oxide layer, respectively.

In general, when an oxide layer presents such an SBD behavior under a bias voltage and an environmental temperature not lower than a respective breakdown temperature, a "tentative" conduction path is formed within the oxide layer, which causes a corresponding MOS capacitor to become more conductive. The term "tentative" as used herein refers to a condition wherein the conduction path may become absent under at least one of various conditions such as, for example, a change (e.g., a decrease) of the bias voltage and a change (e.g., a decrease) of the environmental temperature.

Continuing with the non-limiting example above, since the first and second MOS capacitors become more conductive at respective different temperatures (e.g., at respective breakdown temperatures) under the same bias voltage, in some embodiments, the control logic circuit 106 of the disclosed temperature-sensing device 100 can use such different conductive behaviors of the MOS capacitors of the MOS capacitor circuit 102, in response to the varying environmental temperature, to estimate or determine an instantaneous value of the varying environmental temperature.

The temperature output circuit 104 includes a plurality of comparator circuits, each of which is coupled to a respective MOS capacitor of the MOS capacitor circuit 102. In some embodiments, the comparator circuit of the temperature output circuit 104, which is discussed further below, is configured to compare a current, flowing through the respective MOS capacitor, with a reference current so as to determine whether the respective MOS capacitor has become more conductive, as mentioned above.

The control logic circuit 106, coupled to the MOS capacitor 102 and the temperature output circuit 104, is configured to provide the above-mentioned bias voltage to the MOS capacitors of the MOS capacitor circuit 102. In some embodiments, the bias voltage may be an instantaneous one of various bias voltage values varying over time. Alternatively stated, the control logic circuit 106 may gradually increase/decrease the bias voltage from a first bias voltage to a second bias voltage during a pre-defined period of time, and after the pre-defined period of time, decrease/increase (i.e., reverse) the bias voltage from the second bias voltage to the first bias voltage. As such, within the pre-defined period of time, the MOS capacitors of the MOS capacitor circuit 102 may be applied with a different bias voltage at a respective time.

In some embodiments, the control logic circuit 106 is further configured to receive plural logic states, respectively determined based on whether the MOS capacitors of the MOS capacitor circuit 102 have become more conductive, from the plurality of comparator circuits of the temperature output circuit 104 so as to estimate the instantaneous value of the varying environmental temperature, as mentioned above. Operations of the temperature-sensing device 100 will be discussed in further detail below.

Figure 2:
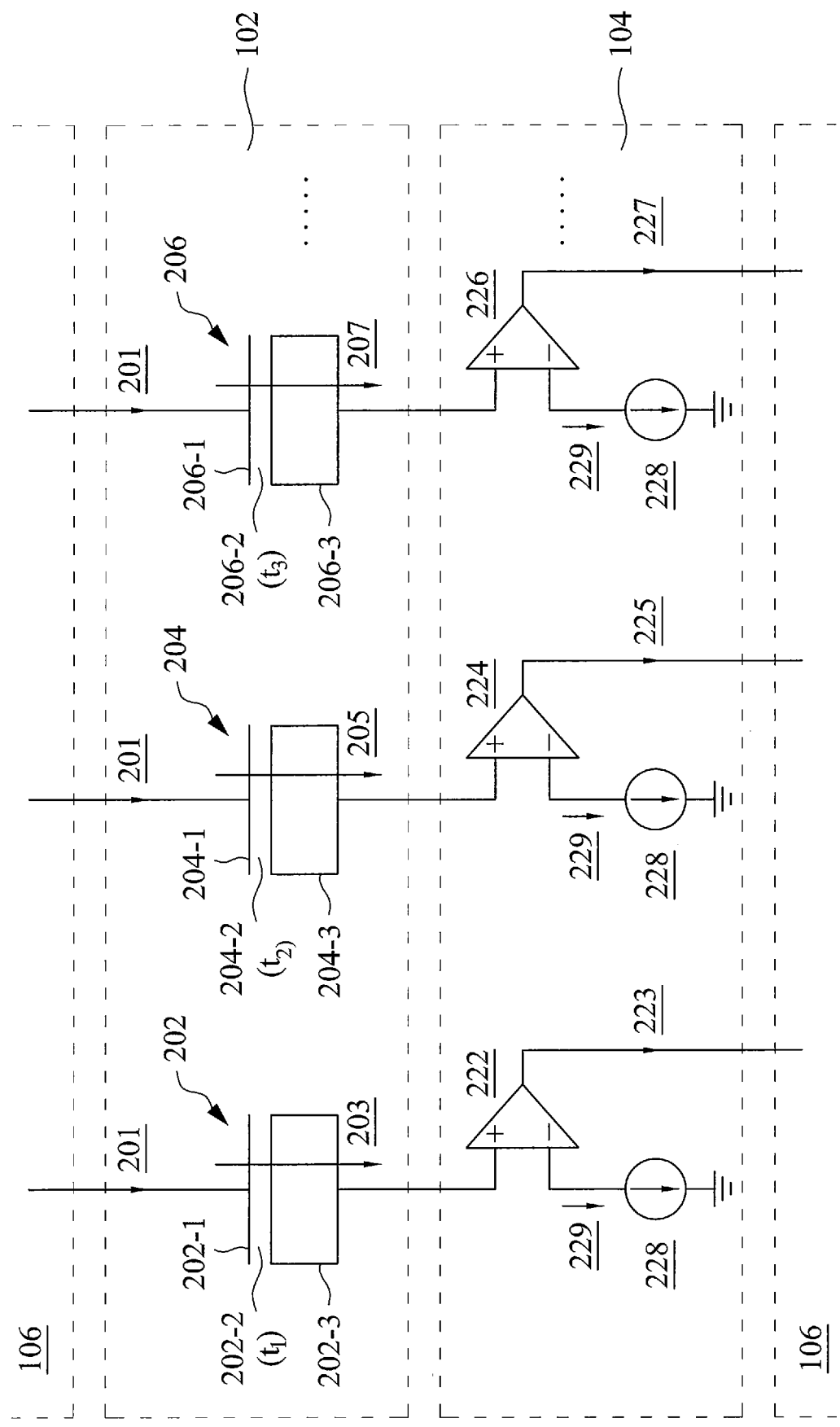
FIG. 2 illustrates an exemplary circuit diagram of part of the temperature-sensing device of FIG. 1, in accordance with some embodiments.

FIG. 2 illustrates respective exemplary circuit diagrams of the MOS capacitor circuit 102 and the temperature output circuit 104, in accordance with various embodiments. It is noted that the circuit diagrams of the MOS capacitor circuit 102 and the temperature output circuit 104 shown in FIG. 2 are simplified for illustration purposes, such that each of the MOS capacitor circuit 102 and the temperature output circuit 104 may include any desired number of MOS capacitors and comparator circuits while remaining within the scope of the present disclosure.

In the illustrated embodiment of FIG. 2, the MOS capacitor circuit 102 includes MOS capacitors 202, 204, and 206. As mentioned above, each of the MOS capacitors 202, 204, and 206 includes an oxide layer disposed between a respective metal contact and semiconductor substrate. For example, the MOS capacitor 202 includes metal contact 202-1, oxide layer 202-2, and semiconductor substrate 202-3, wherein the oxide layer 202-2 is disposed between the metal contact 202-1 and the semiconductor substrate 202-3; the MOS capacitor 204 includes metal contact 204-1, oxide layer 204-2, and semiconductor substrate 204-3, wherein the oxide layer 204-2 is disposed between the metal contact 204-1 and the semiconductor substrate 204-3; and the MOS capacitor 206 includes metal contact 206-1, oxide layer 206-2, and semiconductor substrate 206-3, wherein the oxide layer 206-2 is disposed between the metal contact 206-1 and the semiconductor substrate 206-3.

According to some embodiments, the oxide layers 202-2, 204-2, and 206-2 have respective different thicknesses, as mentioned above. For example, the oxide layer 202-2 has a thickness $t_1$; the oxide layer 204-2 has a thickness $t_2$; the oxide layer 206-2 has a thickness $t_3$, wherein $t_1 < t_2 < t_3$. Further, in some embodiments, a thickest thickness of an oxide layer of one of the plurality of MOS capacitors may not exceed 5 nm. In some embodiments, when the MOS capacitors 202, 204, and 206 are under a same bias voltage (e.g., a positive bias voltage), the oxide layer 202-2 may present an SBD behavior at temperature $T_1$ (breakdown temperature $T_1$); the oxide layer 204-2 may present an SBD behavior at temperature $T_2$ (breakdown temperature $T_2$); and the oxide layer 206-2 may present an SBD behavior at temperature $T_3$ (breakdown temperature $T_3$), wherein $T_1 > T_2 > T_3$. That is, the thicker oxide layer (e.g., the oxide layer 206-2) may present the respective SBD behavior at a lower temperature (e.g., the breakdown temperature $T_3$) when compared to relative thinner oxide layer(s).

In an embodiment, each of the semiconductor substrates 202-3, 204-3, and 206-3 may include a p-type doped silicon material. As such, the corresponding oxide layers 202-2, 204-2, and 206-2 may present respective SBD behaviors at respective different breakdown temperatures under a same positive bias voltage. For example, the MOS capacitor 202 may receive a positive bias voltage at the respective metal contact 202-1; the MOS capacitor 204 may receive the same positive bias voltage at the respective metal contact 204-1; and the MOS capacitor 206 may receive the same positive bias voltage at the respective metal contact 206-1. And when the environmental temperature that the temperature-sensing device 100 is monitoring becomes larger than or equal to one or more of the breakdown temperatures (e.g., $T_1$, $T_2$, $T_3$, etc.), one or more of the corresponding oxide layers 202-2, 204-2, and 206-2 may present respective SBD behaviors to cause changes of conduction behaviors of the corresponding MOS capacitors 202, 204, and 206, which will be discussed in further detail below with respect to FIG. 3.

Referring still to the illustrated embodiment of FIG. 2, the temperature output circuit 104 includes comparators 222, 224, and 226, each of which is coupled to a corresponding MOS capacitor of the MOS capacitor circuit 102, as mentioned above. More specifically, each of comparators 222, 224, and 226 has two inputs, one (e.g., a non-inverting input) of which is coupled to the respective semiconductor substrate of the corresponding MOS capacitor and the other (e.g., an inverting input) of which is coupled to a current source 228. For example, the comparator 222 is coupled to the semiconductor substrate 202-3 at its non-inverting input and to the current source 228 at its inverting input; the comparator 224 is coupled to the semiconductor substrate 204-3 at its non-inverting input and to the current source 228 at its inverting input; and the comparator 226 is coupled to the semiconductor substrate 206-3 at its non-inverting input and to the current source 228 at its inverting input. As such, each of the comparators 222, 224, and 226 can compare signal (e.g., current) levels received at respective inputs to output a logic state for the control logic circuit 106, which will be discussed in further detail below with respect to FIG. 3.

Figure 3:
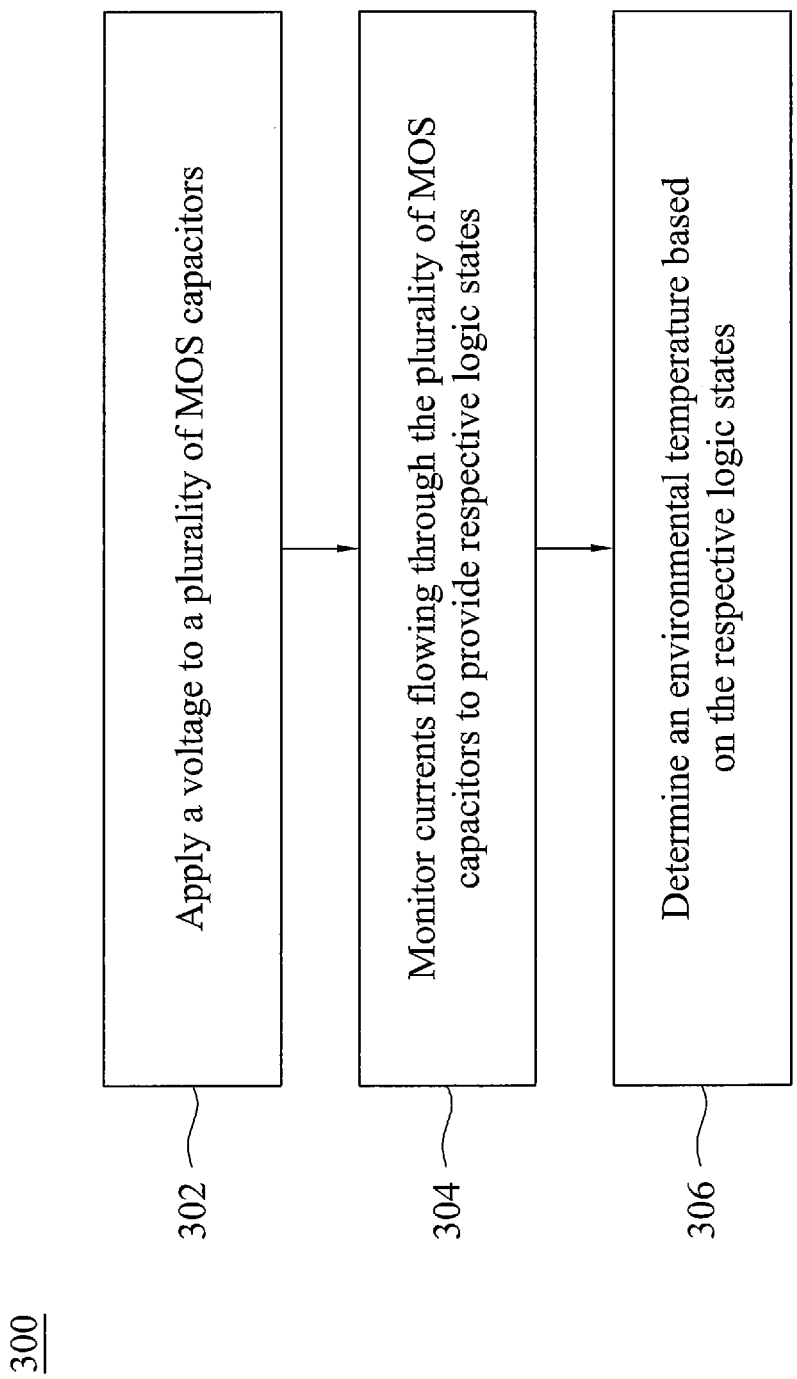
FIG. 3 illustrates a flow chart of an exemplary method to operate the temperature-sensing device of FIG. 1, in accordance with some embodiments.

FIG. 3 illustrates a flow chart of an exemplary method 300 to operate the temperature-sensing device 100, in accordance with various embodiments. In various embodiments, the operations of the method 300 are performed by the respective components illustrated in FIGS. 1-2. For purposes of discussion, the following embodiment of the method 300 will be described in conjunction with FIGS. 1-2. The illustrated embodiment of the method 300 is merely an example. Therefore, it should be understood that any of a variety of operations may be omitted, re-sequenced, and/or added while remaining within the scope of the present disclosure.

The method 300 starts with operation 302 in which a common voltage is applied to a plurality of MOS capacitors, in accordance with various embodiments. Using the illustrated embodiment of FIG. 2 as an example, common voltage 201 is determined and provided by the control logic circuit 106. The common voltage 201 is received at each MOS capacitor's metal contact (e.g., 202-1, 204-1, 206-1, etc.). As mentioned above, such a common voltage 201 may vary over time. In some embodiments, the common voltage 201 is increased from 0 volt to a positive voltage that is high enough to cause each of the MOS capacitors 202, 204, and 206 to operate under a saturation mode.

The term "saturation mode" of a MOS capacitor as used herein refers to a condition that a current flowing through the MOS capacitor (e.g., from respective metal contact to semiconductor substrate of the MOS capacitor) may reach a stable value when a high enough positive voltage is applied to the metal contact of the MOS capacitor. In other words, when the MOS capacitor is applied with a positive voltage higher than the "high enough" positive voltage, the value of the current may remain substantially stable if an environmental temperature is unchanged. In some other embodiments, when the semiconductor substrates 202-3, 204-3, and 206-3 of the MOS capacitors 202, 204, and 206 include other types of doped silicon material (e.g., n-type) and/or other types of semiconductor materials, the common voltage 201 may be a negative voltage.

In some embodiments, referring again to FIG. 2, when the common voltage 201 is high enough to cause each of the MOS capacitors 202, 204, and 206 to operate under respective saturation modes, a current 203, with a substantially stable value "203-$I_1$," flows from the metal contact 202-1, through the oxide layer 202-2, and to the semiconductor substrate 202-3; a current 205, with a substantially stable value "205-$I_1$," flows from the metal contact 204-1, through the oxide layer 204-2, and to the semiconductor substrate 204-3; and a current 207, with a substantially stable value "207-$I_1$," flows from the metal contact 206-1, through the oxide layer 206-2, and to the semiconductor substrate 206-3. It is noted that before the oxide layers 202-2, 204-2, and 206-2 present any SBD behaviors, such currents 203, 205, and 207 are each induced by a tunneling effect across each oxide layer. Thus, the values 203-$I_1$, 205-$I_1$, and 207-$I_1$ may be relatively smaller than respective values of the currents 203, 205, and 207 after the oxide layers 202-2, 204-2, and 206-2 present SBD behaviors.

The method 300 continues to operation 304 in which the currents flowing through the plurality of MOS capacitors are monitored to provide respective logic states, in accordance with various embodiments. Continuing with the same example, the current 203 is monitored by the comparator 222; the current 205 is monitored by the comparator 224; and the current 207 is monitored by the comparator 226. More specifically, in some embodiments, the comparator 222 compares the value of the current 203 (e.g., 203-$I_1$) with a constant value of a current 229 provided by the current source 228. When the value of the current 203 is lower than the constant value of the current 229, the comparator 222 determines an output signal 223 as a logic low (hereinafter "LOW"); and when the value of the current 203 is higher than the constant value of the current 229, the comparator 222 determines the output signal 223 as a logic high (hereinafter "HIGH"). In some embodiments, the comparators 224 and 226 each receives the current 229 as one of respective inputs. Thus, similarly, the comparators 224 and 226 respectively determine output signals 225 and 227 as either HIGH or LOW by comparing the values of the currents 205 and 207 with the value of 229, respectively.

As mentioned above, the oxide layers 202-2, 204-2, and 206-2 are associated with respective breakdown temperatures $T_1$, $T_2$, and $T_3$ (due to the respective different thicknesses across the oxide layers 202-2, 204-2, and 206-2). In some embodiments, such breakdown temperatures $T_1$, $T_2$, and $T_3$ may be each used as a temperature "meter" for an environmental temperature.

In an example, when the environmental temperature is higher than $T_3$ but lower than $T_1$ and $T_2$, the oxide layer 206-2 breaks down such that a conduction path (different from the tunneling effect mentioned above) is formed in the oxide layer 206-2. That is, the MOS capacitor 206 becomes more conductive. Accordingly, the current 207, flowing through the MOS capacitor 206, may present a value 207-$I_2$ that is substantially higher than 207-$I_1$ while the values of the current 203, flowing through the MOS capacitor 202, and the current 205, flowing through the MOS capacitor 204, may remain substantially unchanged. Further, in some embodiments, the value 207-$I_2$ may become higher than the value of current 229, which is kept substantially unchanged, such that the logic state of the output signal 227 may flip from LOW to HIGH (since 207-$I_2$>the value of current 229), while the logic states of the output signals 223 and 225 remain at LOW.

In another example, when the environmental temperature is higher than $T_3$ and $T_2$ but lower than $T_1$, the oxide layers 206-2 and 204-2 break down such that conduction paths (different from the tunneling effect mentioned above) are each formed in the oxide layer 206-2 and 204-2, respectively. That is, the MOS capacitors 206 and 204 both become more conductive. Similarly, the logic states of the output signals 225 and 227 may both flip from LOW to HIGH, while the logic states of the output signal 223 remains at LOW.

Yet in another example, when the environmental temperature is higher than $T_3$, $T_2$, $T_1$, the oxide layers 206-2, 204-2, and 202-2 all break down such that conduction paths are each formed in the oxide layer 206-2, 204-2, and 202-2, respectively. That is, the MOS capacitors 206, 204, and 202 all become more conductive. Similarly, the logic states of the output signals 223, 225, 227 may all flip from LOW to HIGH.

The method 300 continues to operation 306 in which an environmental temperature is determined based on the respective logic states, in accordance with various embodiments. Continuing with the example in which the environmental temperature is higher than $T_3$ but lower than $T_1$ and $T_2$, only the logic state of the output signal 227 flips to HIGH while the logic states of the output signals 223 and 225 remain at LOW. In some embodiments, the control logic circuit 106 periodically receives the logic states of the output signals 223, 225, and 227 to determine the environmental temperature. In this example, the control logic circuit 106 may determine that the environmental temperature is higher than $T_3$ but lower than $T_1$ and $T_2$, wherein $T_1$, $T_2$, and $T_3$ are used as temperature meters. Thus, it can be understood that when more MOS capacitors, whose oxide layers each has a respective oxide thickness, are included in the temperature-sensing device 100, more such temperature meters can be provided, which may advantageously increase the temperature-sensing device 100's accuracy and sensitivity to measure the environmental temperature.

In an embodiment, a temperature-sensing device configured to monitor a temperature is disclosed. The temperature-sensing device includes: a first capacitor comprising a first oxide layer with a first thickness; a second capacitor comprising a second oxide layer with a second thickness, wherein the second thickness of the second oxide layer is different from the first thickness of the first oxide layer; and a control logic circuit, coupled to the first and second capacitors, and configured to determine whether the monitored temperature is equal to or greater than a threshold temperature based on whether at least one of the first and second oxide layers breaks down.

In another embodiment, a temperature-sensing device includes: a first capacitor comprising a first oxide layer with a first thickness; a second capacitor comprising a second oxide layer with a second thickness, wherein the second thickness is different from the first thickness causing the first and second oxide layers to have respective different breakdown temperatures; and a control logic circuit, coupled to the first and second capacitors, and configured to estimate a temperature based on whether the temperature has become not lower than one of the breakdown temperatures of the first and second oxide layers.

Yet in another embodiment, a method includes: providing a plurality of capacitors, wherein each of the plurality of capacitors comprises a respective oxide layer with a respective thickness that is associated with a respective breakdown temperature; applying a common voltage to the plurality of capacitors to cause respective currents to flow through the plurality of capacitors; in response to a varying environmental temperature, comparing each of the respective currents with a reference current so as to provide a respective logic state based on the respective breakdown temperature; and determining the environmental temperature using the respective logic state.

The foregoing outlines features of several embodiments so that those ordinary skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A device configured to monitor a temperature, comprising:
   a first capacitor comprising a first oxide layer with a first thickness;
   a second capacitor comprising a second oxide layer with a second thickness, wherein the second thickness of the second oxide layer is different from the first thickness of the first oxide layer; and
   a control logic circuit configured to determine whether the monitored temperature is equal to or greater than a threshold temperature based on whether at least one of the first and second oxide layers breaks down, wherein the control logic circuit is coupled to the first and second capacitors through a first comparator circuit and a second comparator circuit, respectively.

2. The device of claim 1, wherein the first and second oxide layers are each coupled between respective metal contacts and semiconductor substrates.

3. The device of claim 1, wherein:
   the first comparator circuit is coupled to the first capacitor and configured to compare a first current flowing through the first capacitor with a reference current; and
   the second comparator circuit is coupled to the second capacitor and configured to compare a second current flowing through the second capacitor with the reference current.

4. The device of claim 3, wherein the first oxide layer is associated with a first breakdown temperature when the first capacitor is biased under a first voltage, and the second oxide layer is associated with a second breakdown temperature when the second capacitor is biased under the first voltage.

5. The device of claim 4, wherein the threshold temperature is between the first and second breakdown temperatures.

6. The device of claim 4, wherein when the monitored temperature is higher than the first breakdown temperature but lower than the second breakdown temperature, the first oxide layer breaks down and the second oxide layer does not break down when both the first and second capacitors are biased under the first voltage, the first thickness of the first oxide layer being thicker than the second thickness of the second oxide layer.

7. The device of claim 6, wherein the first current becomes substantially higher than the reference current causing the first comparator circuit to output a first logic state, and the second current remains substantially lower than the reference current causing the second comparator circuit to output a second logic state logically inverted to the first logic state.

8. The device of claim 7, wherein the control logic circuit uses the first and second logic states to determine that the monitored temperature is higher than the first breakdown temperature but lower than the second breakdown temperature.

9. The device of claim 6, wherein when the first and second capacitors are to be biased under a second voltage substantially lower than the first voltage, the first current becomes substantially lower than the reference current and the second current remains substantially lower than the reference current.

10. A device, comprising:
    a first capacitor comprising a first oxide layer with a first thickness;
    a second capacitor comprising a second oxide layer with a second thickness, wherein the second thickness is different from the first thickness causing the first and second oxide layers to have respective different breakdown temperatures;
    a control logic circuit configured to estimate a temperature based on whether the temperature has become not lower than one of the breakdown temperatures of the first and second oxide layers, wherein the control logic circuit is coupled to the first and second capacitors through a first comparator circuit and a second comparator circuit, respectively.

11. The device of claim 10, wherein the first and second oxide layers are each coupled between respective metal contacts and semiconductor substrates.

12. The device of claim 10, wherein:
    the first comparator circuit is coupled to the first capacitor and configured to compare a first current flowing through the first capacitor with a reference current; and
    the second comparator circuit is coupled to the second capacitor and configured to compare a second current flowing through the second capacitor with the reference current.

13. The device of claim 12, wherein when the temperature is higher than the breakdown temperature of the first oxide layer but lower than the breakdown temperature of the second oxide layer, the first oxide layer breaks down and the second oxide layer remains intact when both the first and second capacitors are biased under a first voltage.

14. The device of claim 13, wherein the first thickness of the first oxide layer is thicker than the second thickness of the second oxide layer.

15. The device of claim 13, wherein the first current becomes substantially higher than the reference current causing the first comparator circuit to output a first logic state, and the second current remains substantially lower than the reference current causing the second comparator circuit to output a second logic state logically inverted to the first logic state.

16. The device of claim 15, wherein the control logic circuit uses the first and second logic states to determine that the monitored temperature is higher than the breakdown temperature of the first oxide layer but lower than the breakdown temperature of the second oxide layer.

17. The device of claim 13, wherein when the first and second capacitors are to be biased under a second voltage substantially lower than the first voltage, the first current becomes substantially lower than the reference current and the second current remains substantially lower than the reference current.

18. The device of claim 10, further comprising:
    a third capacitor comprising a third oxide layer with a third thickness, wherein the third thickness is different from the first and second thicknesses thereby causing the third oxide layer to have a different breakdown temperature from the respective breakdown temperatures of the first and second oxide layers, wherein the control logic circuit is further configured to monitor the temperature based on whether the temperature has become not lower than the breakdown temperatures of the first and second oxide layers but lower than the breakdown temperature of the third oxide layer thereby causing the first and second oxide layers to break down.

19. A method, comprising:

providing a plurality of capacitors, wherein each of the plurality of capacitors comprises:

a respective metal contact, a respective semiconductor substrate, and a respective oxide layer with a respective thickness that is associated with a respective breakdown temperature;

applying a common voltage to the metal contacts in the plurality of capacitors to cause respective currents to flow through the plurality of capacitors;

in response to a varying environmental temperature, comparing each of the respective currents with a reference current so as to provide a respective logic state based on the respective breakdown temperature; and determining the environmental temperature using the respective logic state.

20. The method of claim 19, wherein the respective oxide layer is coupled between the respective metal contact and the respective semiconductor substrate.

* * * * *